Nov. 11, 1947.  A. J. PALESE  2,430,684
PORTABLE WELDING GUN
Filed Nov. 23, 1945  2 Sheets-Sheet 1
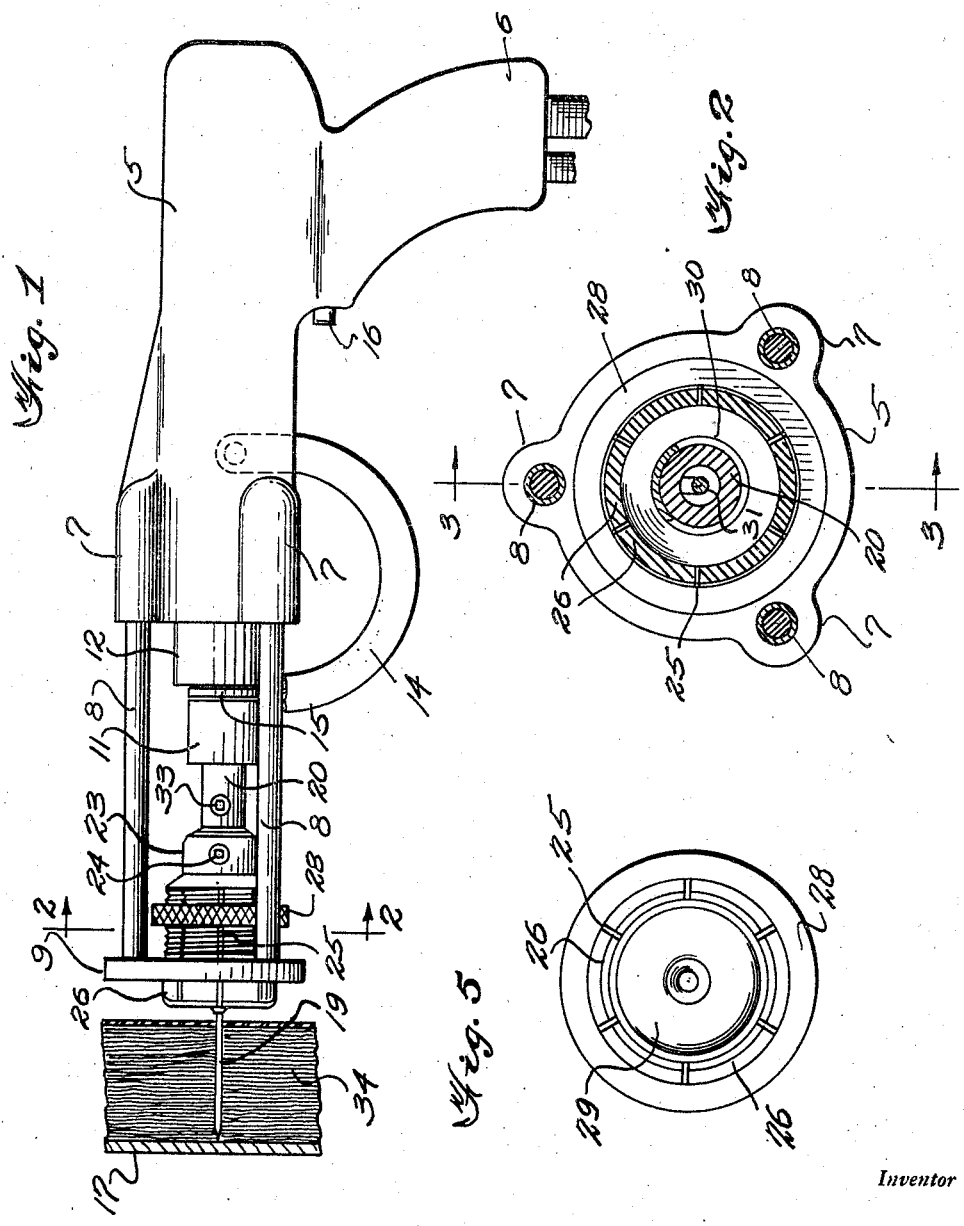
Inventor
Andrew J. Palese
By Clarence A. O'Brien
and Harvey B. Jacobson
Attorneys Nov. 11, 1947.   A. J. PALESE   2,430,684
PORTABLE WELDING GUN
Filed Nov. 23, 1945   2 Sheets-Sheet 2
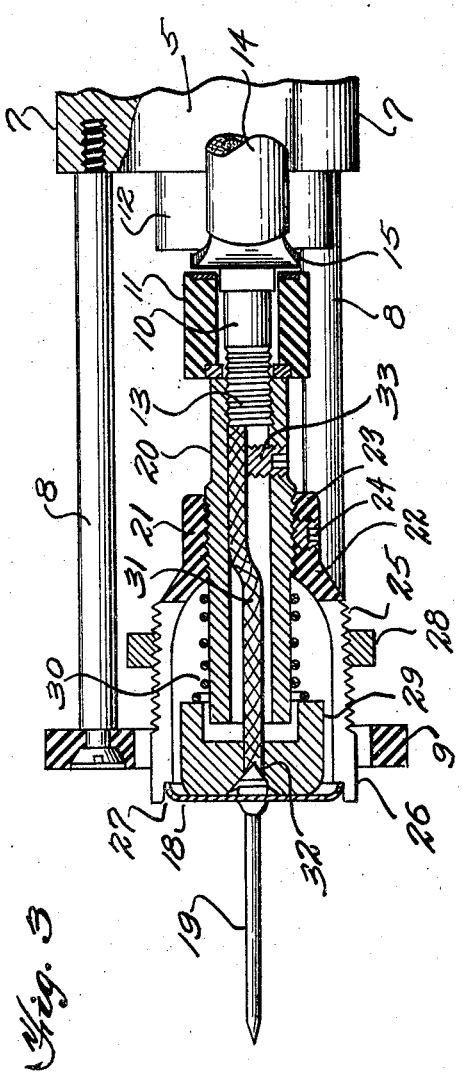
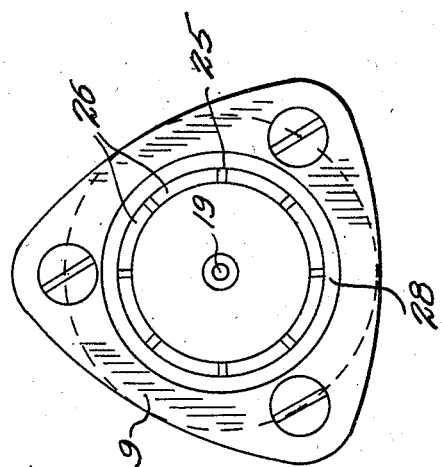
Inventor
Andrew J. Palese
By Clarence A. O'Brien
and Harvey B. Jackson
Attorneys Patented Nov. 11, 1947

2,430,684

UNITED STATES PATENT OFFICE 2,430,684

PORTABLE WELDING GUN

Andrew J. Palese, Wilmington, Del.

Application November 23, 1945, Serial No. 630,495

6 Claims. (Cl. 219—4)

This invention relates to portable welding guns of the type disclosed in the U. S. patent to Andrew W. Anderson, 2,360,837, dated October 24, 1944, and has more particular reference to an improved chuck for holding headed fastener or insulation pins while welding them to a plate for securing spun glass insulation material to said plate.

The primary object of the present invention is to provide a very efficient chuck of the above kind which may be readily applied to the plunger rod of the welding gun, and one which will insure a good electrical contact with the head of the pin while held in the chuck so as to avoid arcing between the chuck and the pin head with consequent loss of time and destruction of pins.

A further object of the invention is to provide a chuck of the above kind which is readily adjustable to receive the heads of fastener pins having heads of different diameters.

Still another object of the invention is to provide a chuck of the above kind which is safe to use, and which includes resilient normally expanded jaws and manually operable means for adjustably limiting the expansion of the jaws so that they will properly engage and retain the head of a fastener pin having a head of any given diameter, thereby avoiding accidental detachment of the pin from the chuck although permitting ready removal of the gun from the pin as soon as it has been welded to the plate.

The exact nature of the present invention, as well as specific objects and features thereof, will become apparent from the following description when considered in connection with the accompanying drawings, in which:

Figure 1 is a side elevational view of a welding gun equipped with a chuck constructed in accordance with the present invention and showing the gun in use.

Figure 2 is an enlarged horizontal section taken on line 2—2 of Figure 1.

Figure 3 is an enlarged fragmentary view, partly in elevation and partly in longitudinal section through the chuck and adjacent parts of the gun.

Figure 4 is an end elevation looking upwardly at Figure 3.

Figure 5 is a view similar to Figure 4 of the chuck per se with the parts of the gun eliminated and the fastener pin removed from the chuck.

Referring in detail to the drawings, the present chuck is adapted for use in connection with a conventional portable welding gun that includes a casing 5 provided at its upper end with a handle 6 and formed on its lower end with a plurality of external uniformly spaced internally threaded bosses 7. The bosses 7 carry legs 8 that support a work contacting ring 9, of insulating material, at their outer ends. Slidable through the forward end of the casing 5 is a plunger rod 10 having insulating collars 11 and 12 thereon and provided with a threaded outer end 13. Welding current is supplied to the rod 13 by a looped cable 14 having an apertured connector 15 which is received on the plunger rod 10 between the collars 11 and 12. The flow of welding current is controlled by a push button switch 16, and the plunger rod 10 is spring projected and solenoid retracted as generally disclosed in the Anderson patent referred to above. A holder is usually removably threaded on to the end 13 of the plunger rod 10, and the nature of this holder depends upon the character of the element to be welded to a plate 17 by use of the gun. For welding headed fastener or insulation pins to the plate 17 so as to secure spun glass insulation material to said plate, a chuck has heretofore been provided to receive the head 18 of the fastener or insulation pin 19. However, the form of chuck heretofore provided has not been entirely satisfactory because of its failure to properly hold the pins and to provide a good electrical connection with the heads of the pins. The result has been many occurrences of arcing between the chuck and the heads of the pins and consequent ruining of the pins, as well as the loss of time in removal of the ruined pins from the chuck because of being welded to the latter by the arcing.

The object of the present invention is to provide an improved form of chuck by means of which the above mentioned objections to prior chucks of the kind described may be effectively overcome. The present chuck includes a metallic shank member 20 of tubular form which is externally threaded intermediate its ends at 21, and a hollow chuck head 22 of insulating material which is provided at one end with a reduced neck 23 that is threaded onto the intermediate portion of the shank member 20 and secured thereon by a set-screw 24. The chuck body is slotted longitudinally inwardly from its outer end as at 25 so as to provide a circular series of similar resilient jaws 26 between the slots. The jaws 26 are normally tensioned to expand and are provided at the inner sides of their outer ends with undercut notches 27 to retainingly receive the upturned margin of the pin head 18. Means is provided to contract the jaws 26 so that they are properly positioned to have the head 18 of the pin 19 snapped into the notches 27, whereby the pin will be effectively retained by the chuck although permitting the gun to be removed from the pin when it has been welded to the plate 17. The jaws 26 will yield sufficiently to disengage them from the pin head 18 when the jaws have been properly adjusted and tensioned. For so adjusting and tensioning the jaws 26, an adjusting ring 28 is adjustably threaded on the jaws 26 so as to embrace the inner end portions of the latter, it being understood that the jaws 26 are normally in forwardly diverging relation and will thus be contracted upon outward or forward adjustment of the ring 28 or allowed to expand upon inward or rearward adjustment of said ring 28.

In order to provide a good electrical connection with the head 18 of the pin 19 when it is held by the chuck, a contact head 29 of relatively large diameter is slidably disposed within the chuck body 22 at the outer end portions of the jaws 26 and over the outer or forward end of the shank 20. This contact head 29 is projected to effectively engage the pin head 18 when the latter is engaged by the jaws 26, by means of a light helical compression spring 30 disposed within the body 22 and encircling the forward end of shank 20 between the contact head 29 and the inner end of the chuck body 22. A flexible conductor 31 is disposed within the shank 20 and is extended through the forward end of the latter and connected at 32 with the head 29 centrally of the latter. The inner end of the conductor 31 is held adjacent the inner end of the shank 20 by means of a set-screw 33, so that when the inner end of said shank 20 is threaded onto the plunger rod 10, the inner end of said conductor 31 will firmly contact the end of the plunger rod 10 and insure proper passage of current from the rod 10 to and through the conductor 31. Sufficient slack is left in the conductor 31 to permit the necessary projection and retraction of the contact head 29. The conductor 31 may properly limit the projection of the contact head 29 by the spring 30, and the head 29 is retracted or pressed back in the chuck body 22 by the pin head 18 when the latter is snapped into engagement with the jaws 26. A very efficient electrical connection is thus insured between the head 29 and the head 18 of the pin so that arcing will not occur between the chuck and the pin head 18 and cause welding of the pin head to the chuck, an occurrence which would obviously result in ruining the pin and loss of much time in the use of the gun. Due to the fact that the chuck body 22 is formed of insulating material, the chuck is safe to use because of the fact that the contact head 29 and the conductor 31 are effectively housed.

In use, the head 18 of the fastener pin 19 is engaged with the jaws 26 and the contact head 29 is pressed into engagement with the pin head 18 by the spring 30. The pointed end of the pin 19 is then pushed through the insulating material 34 until its pointed end engages and secures good electrical contact with the plate 17. It will be understood that the plate 17 is one electrode in the electric circuit, and the pin 19 is the other electrode. The gun is used to press the pin 19 against the plate, establishing the electric circuit. The gun then retracts the pin 19 a slight distance, whereby an arc is set up between the pin and the plate which melts the end of the pin and the underlying part of the plate. The gun then plunges the pin against the plate, whereupon the circuit is immediately broken and the gun removed, leaving the pin welded to the plate. The pressure of the ring 9 against the work causes the plunger rod 10 to move upwardly against the action of its projecting spring within the body 5, and the melting of the end of the pin 19 permits the pin head 18 to be pressed against the top of the work immediately before the gun is removed.

From the foregoing description, it is believed that the construction, operation and advantages of the present invention will be readily appreciated and understood by those skilled in the art. It will be seen that I have provided a very simple, durable and efficient chuck for the intended purpose and one that may be readily and economically manufactured, as well as readily assembled and taken apart for repair. Minor changes may be made in details of construction illustrated and described, such as fall within the spirit of the invention as claimed.

What I claim is:

1. A chuck for holding a headed fastener pin including a hollow body having a tubular shank member projecting from the inner end thereof, said shank member being adapted to be secured on the outer end portion of the spring projected and solenoid retracted plunger rod of a portable welding gun, the outer end portion of the body being split longitudinally to provide a plurality of resilient jaws for reception of the disc head of the fastener pin, a relatively large contact head arranged within and movable longitudinally of the body, a spring in the body acting to project said contact head into engagement with the head of the fastener pin, and a flexible conductor for conducting welding current from the plunger rod to the contact head, said conductor having one end attached to the contact head and its other end secured in the shank member in position to contact the outer end of the plunger rod.

2. A chuck for holding a headed fastener pin including a hollow body having a tubular shank member projecting from the inner end thereof, said shank member being adapted to be secured on the outer end portion of the spring projected and solenoid retracted plunger rod of a portable welding gun, the outer end portion of the body being split longitudinally to provide a plurality of resilient jaws for reception of the disc head of the fastener pin, a relatively large contact head arranged within and movable longitudinally of the body, a spring in the body acting to project said contact head into engagement with the head of the fastener pin, and a flexible conductor for conducting welding current from the plunger rod to the contact head, said conductor having one end attached to the contact head and its other end secured in the shank member in position to contact the outer end of the plunger rod, said chuck body being formed of insulating material.

3. A chuck for holding a headed fastener pin including a hollow body having a tubular shank member projecting from the inner end thereof, said shank member being adapted to be secured on the outer end portion of the spring projected and solenoid retracted plunger rod of a portable welding gun, the outer end portion of the body being split longitudinally to provide a plurality of resilient jaws for reception of the disc head of the fastener pin, a relatively large contact head arranged within and movable longitudinally of the body, a spring in the body acting to project said contact head into engagement with the head of the fastener pin, and a flexible conductor for conducting welding current from the plunger rod to the contact head, said conductor having one end attached to the contact head and its other end secured in the shank member in position to contact the outer end of the plunger rod, said shank member having a part projecting forwardly into the body and having the contact head slidably disposed thereover, said spring surrounding the part of said shank member between the body and the contact head.

4. A chuck for holding a headed fastener pin including a hollow body having a tubular shank member projecting from the inner end thereof, said shank member being adapted to be secured on the outer end portion of the spring projected and solenoid retracted plunger rod of a portable welding gun, the outer end portion of the body being split longitudinally to provide a plurality of resilient jaws for reception of the disc head of the fastener pin, a relatively large contact head arranged within and movable longitudinally of the body, a spring in the body acting to project said contact head into engagement with the head of the fastener pin, and a flexible conductor for conducting welding current from the plunger rod to the contact head, said conductor having one end attached to the contact head and its other end secured in the shank member in position to contact the outer end of the plunger rod, said jaws being tensioned to normally diverge forwardly, and a ring threaded on said jaws for adjustment longitudinally of the latter so as to selectively set the jaws for retaining reception of the heads of fastener pins having heads of different diameters.

5. A chuck for holding a headed fastener pin including a hollow body having a tubular shank member projecting from the inner end thereof, said shank member being adapted to be secured on the outer end portion of the spring projected and solenoid retracted plunger rod of a portable welding gun, the outer end portion of the body being split longitudinally to provide a plurality of resilient jaws for reception of the disc head of the fastener pin, a relatively large contact head arranged within and movable longitudinally of the body, a spring in the body acting to project said contact head into engagement with the head of the fastener pin, and a flexible conductor for conducting welding current from the plunger rod to the contact head, said conductor having one end attached to the contact head and its other end secured in the shank member in position to contact the outer end of the plunger rod, and means to selectively adjust the jaws for retaining reception of the heads of fastener pins having heads of different diameters.

6. In combination with the spring projected and solenoid retracted plunger rod of a portable welding gun, a chuck mounted on the outer end of said plunger rod for holding a headed fastener pin, said chuck including a hollow body having a tubular shank member projecting from the inner end thereof and threaded on the outer end portion of the plunger rod, the outer end portion of the body being split longitudinally to provide a plurality of resilient jaws for reception of the disc head of the fastener pin, said jaws having undercut notches at the inner sides of the outer ends thereof for retaining reception of the up-turned margin of the fastener pin head, a relatively large contact head arranged within and movable longitudinally of the body, a spring in the body acting to project said head into engagement with the head of the fastener pin, and a flexible conductor for conducting the welding current from the plunger rod to the contact head, said conductor having one end attached to the contact head and its other end secured in the shank member in position to contact the outer end of the plunger rod.

ANDREW J. PALESE.

REFERENCES CITED

The following references are of record in the file of this patent:

UNITED STATES PATENTS

| Number | Name | Date |
|---|---|---|
| 2,110,832 | Hagg et al. | Mar. 8, 1938 |
| 2,378,720 | Nelson | June 19, 1945 |